(12) United States Patent
Zaba et al.

(10) Patent No.: US 7,309,017 B2
(45) Date of Patent: Dec. 18, 2007

(54) SECURE PHYSICAL DOCUMENTS, AND METHODS AND APPARATUS FOR PUBLISHING AND READING THEM

(75) Inventors: Stefek Malkowski Zaba, Bristol (GB); Keith Alexander Harrison, Monmouthshire (GB); John Deryk Waters, Bath (GB); James Thomas Edward McDonnell, Malmesbury (GB); Richard Anthony Lawrence, S. Glos (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/697,272

(22) Filed: Oct. 31, 2003

(65) Prior Publication Data

US 2004/0134994 A1    Jul. 15, 2004

(30) Foreign Application Priority Data

Jan. 15, 2003    (GB) ................................. 0300906.5

(51) Int. Cl.
| | | |
|---|---|---|
| G06K 19/00 | (2006.01) | |
| G06K 5/00 | (2006.01) | |
| G05B 19/00 | (2006.01) | |
| G05B 23/00 | (2006.01) | |
| G06F 7/00 | (2006.01) | |
| G06F 7/04 | (2006.01) | |
| G07D 7/00 | (2006.01) | |
| G07F 7/12 | (2006.01) | |
| G08B 29/00 | (2006.01) | |
| G08C 19/00 | (2006.01) | |
| H04B 1/00 | (2006.01) | |
| H04B 3/00 | (2006.01) | |
| H04Q 1/00 | (2006.01) | |
| H04Q 9/00 | (2006.01) | |

(52) U.S. Cl. ..................................... 235/487; 340/5.86
(58) Field of Classification Search ................ 235/492, 235/384, 385, 379–382, 493, 487; 711/163; 340/5.86, 572.1, 5.74, 5.8, 10.1; 283/72, 283/74, 82, 83, 85; 713/194; 726/26, 29; 358/498, 1.14
See application file for complete search history.

(56) References Cited

U.S. PATENT DOCUMENTS

| | | | | | |
|---|---|---|---|---|---|
| 4,025,759 | A | * | 5/1977 | Scheffel ....................... | 235/380 |
| 4,451,521 | A | * | 5/1984 | Kaule et al. ................. | 428/199 |
| 4,612,413 | A | * | 9/1986 | Robert et al. ............... | 713/169 |
| 4,802,218 | A | * | 1/1989 | Wright et al. ................ | 705/60 |
| 4,900,903 | A | * | 2/1990 | Wright et al. ............... | 235/380 |
| 5,055,913 | A | * | 10/1991 | Haghiri-Tehrani .......... | 257/676 |
| 5,090,736 | A | * | 2/1992 | Minkus ........................ | 283/77 |
| 5,762,378 | A | * | 6/1998 | Phillips ........................ | 283/72 |
| 5,898,370 | A | * | 4/1999 | Reymond .................... | 340/540 |

(Continued)

FOREIGN PATENT DOCUMENTS

EP    1 139 302    10/2001

(Continued)

*Primary Examiner*—Daniel Walsh

(57) ABSTRACT

A security document, comprises a printed document and one or more memory circuits adapted to be read wirelessly attached to or incorporated within the printed document, wherein data in the memory circuit is protected from access by an unauthorised reader, and wherein the memory circuit is physically isolated so as to inhibit physical tampering or to indicate when physical tampering has occurred. Methods of publishing and of reading such security documents are described.

28 Claims, 10 Drawing Sheets

U.S. PATENT DOCUMENTS

| | | | | |
|---|---|---|---|---|
| 6,068,192 A * | 5/2000 | McCabe et al. | | 235/487 |
| 6,257,486 B1 * | 7/2001 | Teicher et al. | | 235/380 |
| 6,480,869 B1 * | 11/2002 | Fujioka | | 708/252 |
| 6,547,151 B1 * | 4/2003 | Baldi | | 235/492 |
| 6,636,614 B1 * | 10/2003 | Koeppen et al. | | 382/100 |
| 6,672,512 B2 * | 1/2004 | Bridgelall | | 235/462.46 |
| 6,704,608 B1 * | 3/2004 | Azuma | | 700/66 |
| 6,776,332 B2 * | 8/2004 | Allen et al. | | 235/380 |
| 6,794,000 B2 * | 9/2004 | Adams et al. | | 428/40.1 |
| 6,827,279 B2 * | 12/2004 | Teraura | | 235/492 |
| 7,142,115 B2 * | 11/2006 | Waters | | 340/572.1 |
| 7,227,446 B2 * | 6/2007 | Kumazaki et al. | | 340/5.61 |
| 7,243,840 B2 * | 7/2007 | Bason et al. | | 235/380 |
| 2001/0015382 A1 * | 8/2001 | Tiffany | | 235/488 |
| 2001/0029488 A1 * | 10/2001 | Takeshima et al. | | 705/41 |
| 2002/0014529 A1 * | 2/2002 | Tanaka | | 235/449 |
| 2002/0057440 A1 | 5/2002 | Weiner | | |
| 2002/0087867 A1 * | 7/2002 | Oberle et al. | | 713/183 |
| 2002/0100803 A1 * | 8/2002 | Sehr | | 235/384 |
| 2002/0135481 A1 * | 9/2002 | Conwell et al. | | 340/572.1 |
| 2002/0170973 A1 * | 11/2002 | Teraura | | 235/492 |
| 2003/0024994 A1 * | 2/2003 | Ladyansky | | 235/492 |
| 2003/0031819 A1 * | 2/2003 | Adams et al. | | 428/40.1 |
| 2003/0042306 A1 * | 3/2003 | Irwin et al. | | 235/441 |
| 2003/0057286 A1 * | 3/2003 | Yamagishi et al. | | 235/492 |
| 2003/0058110 A1 * | 3/2003 | Rich | | 340/573.1 |
| 2003/0136828 A1 * | 7/2003 | Takesada et al. | | 235/380 |
| 2003/0136850 A1 * | 7/2003 | Yamagishi et al. | | 235/492 |
| 2003/0136851 A1 * | 7/2003 | Habara et al. | | 235/492 |
| 2003/0154355 A1 * | 8/2003 | Fernandez | | 711/163 |
| 2003/0163696 A1 * | 8/2003 | Rancien | | 713/170 |
| 2003/0164611 A1 * | 9/2003 | Schneider et al. | | 283/57 |
| 2003/0169456 A1 * | 9/2003 | Suzaki | | 358/3.28 |
| 2003/0208471 A1 * | 11/2003 | Kirshenbaum | | 707/1 |
| 2003/0225572 A1 * | 12/2003 | Adams et al. | | 704/201 |
| 2004/0049451 A1 * | 3/2004 | Berardi et al. | | 705/39 |
| 2004/0060978 A1 * | 4/2004 | Okamoto et al. | | 235/375 |
| 2004/0066296 A1 * | 4/2004 | Atherton | | 340/572.1 |
| 2004/0100363 A1 * | 5/2004 | Lane et al. | | 340/5.86 |
| 2004/0118930 A1 * | 6/2004 | Berardi et al. | | 235/492 |
| 2004/0134994 A1 * | 7/2004 | Zaba et al. | | 235/492 |
| 2004/0173686 A1 * | 9/2004 | Al Amri | | 235/492 |
| 2004/0189672 A1 * | 9/2004 | Yamazaki et al. | | 345/619 |
| 2004/0210821 A1 * | 10/2004 | Kasser | | 715/500 |
| 2004/0233040 A1 * | 11/2004 | Lane et al. | | 340/5.86 |
| 2004/0255081 A1 * | 12/2004 | Arnouse | | 711/115 |
| 2005/0007236 A1 * | 1/2005 | Lane et al. | | 340/5.86 |
| 2005/0061879 A1 * | 3/2005 | Honda | | 235/385 |
| 2005/0085951 A1 * | 4/2005 | Walker et al. | | 701/1 |
| 2005/0109851 A1 * | 5/2005 | Krul et al. | | 235/492 |
| 2005/0161501 A1 * | 7/2005 | Giering et al. | | 235/379 |
| 2005/0181160 A1 * | 8/2005 | Schneider | | 428/36.4 |
| 2005/0236489 A1 * | 10/2005 | Droz | | 235/487 |
| 2005/0242957 A1 * | 11/2005 | Lindsay et al. | | 340/572.7 |
| 2005/0274794 A1 * | 12/2005 | Bason et al. | | 235/380 |
| 2006/0055506 A1 * | 3/2006 | Nicolas | | 340/5.1 |
| 2006/0065714 A1 * | 3/2006 | Jesme | | 235/380 |
| 2006/0202010 A1 * | 9/2006 | McDonnell | | 235/375 |
| 2006/0208089 A1 * | 9/2006 | Sadler et al. | | 235/487 |
| 2006/0249042 A1 * | 11/2006 | Heim et al. | | 101/483 |
| 2006/0249951 A1 * | 11/2006 | Cruikshank et al. | | 283/92 |
| 2007/0095928 A1 * | 5/2007 | Balinsky et al. | | 235/492 |
| 2007/0114788 A1 * | 5/2007 | Carr et al. | | 283/72 |
| 2007/0152829 A1 * | 7/2007 | Lindsay et al. | | 340/572.3 |

FOREIGN PATENT DOCUMENTS

| | | |
|---|---|---|
| EP | 1 148 440 | 10/2001 |
| EP | 1 179 810 | 2/2002 |
| EP | 1 179 811 | 2/2002 |

\* cited by examiner

SECURE PHYSICAL DOCUMENTS, AND METHODS AND APPARATUS FOR PUBLISHING AND READING THEM

FIELD OF THE INVENTION

The invention relates to secure physical documents, to methods by which they can be created, and to methods by which they can be read. Aspects of the invention are particularly suitable for use in passbooks, either to identify an authorised bearer (such as passports) or to allow access by an authorised bearer to an asset (such as bank books).

BACKGROUND TO THE INVENTION

It is well known for smart cards (both conventional smart cards with contacts, and inductively powered contactless smart cards) to contain information identifying a bearer and to allow access to a user asset. Security passes are a further example of a technology in which inductively powered devices are used to identify a bearer—for conventional security pass technology, the presence of a valid security pass is sufficient to operate the security mechanism.

For a number of applications, existing technologies such are these are unsatisfactory. They may be relatively insecure—in the case of a conventional security pass, simply obtaining the security pass may be enough to enable access for an unauthorised person. Many techniques for physical attack upon smart cards are known, and smart cards are also an unsatisfactory form factor for many applications—such as a passport, or a bank passbook. In such cases a known approach is to provide a physical book and a separate smart card—however, it would clearly be desirable to provide instead a physical document that provides a satisfactory measure of security, while preserving the possibility of providing various significant information digitally, as is possible with a smart card.

SUMMARY OF THE INVENTION

In a first aspect, the invention provides a security document, comprising a printed document and one or more memory circuits attached to or incorporated within the printed document adapted to be read wirelessly, wherein data in the memory circuit is protected from access by an unauthorised reader, and wherein the memory circuit is physically isolated so as to inhibit physical tampering or to indicate when physical tampering has occurred.

The combination of elements allows for security models that do not currently exist. As the memory spot is accessed wireless (and is preferably also wirelessly powered, most conveniently) inductively powered, it can be embedded in the document, allowing forms of tamperproofing that involve physical isolation from potential attacks. Data can be held which personalises the document to a user in a way that is not readily obvious (for example, an image of the user held electronically in a document which itself contains no visible image of the user). In certain embodiments, the memory spot can be provided with processing power to enable a security exchange to be conducted with a reader so as to prevent unauthorised readers from gaining access to the retained information in any useful form.

In a second aspect, the invention provides a method of publishing a security document, comprising: determining first information for printing in a printed document, and second information for writing to one or more memory circuits for attachment to or incorporation within the printed document; protecting the second information from unauthorised reading; printing the first information in the printed document; writing the second information to one or more memory circuits adapted to be read wirelessly for attachment to or incorporation within the printed document; and physically isolating the one or more memory circuits so as to inhibit physical tampering or to indicate when physical tampering has occurred.

In a third aspect, the invention provides a method of reading a security document comprising a printed document and one or more memory circuits attached to or incorporated within the printed documents, comprising: obtaining authorisation information to read the security document; reading first information printed in the printed document; wirelessly powering at least one memory circuit and wirelessly reading protected second information stored in said memory circuit; reading the second information by using the authorisation information; and comparing the second information to the first information.

DESCRIPTION OF DRAWINGS

Specific embodiments of the invention will now be described, by way of example, with reference to the accompanying drawings, of which.

DESCRIPTION OF SPECIFIC EMBODIMENTS

There will first be described, with reference to FIGS. 1 to 3, a particularly suitable technology by which memory circuits can be attached to or incorporated within printed documents to enable security documents according to embodiments of the invention to be produced. The memory circuits described, referred to as memory tags, are a form of inductively powered circuit read and written by radio-frequency communication—as such they resemble the existing RFID tag—but it will be appreciated by the skilled person that alternative forms of memory circuit may also be employable for the purpose described. There will then be described, with reference to FIGS. 4 to 6, an exemplary method of printing documents whose content for is divided between a printed document and one or more memory circuits attached to or incorporated within printed documents—the publishing of such documents will also be discussed, particularly in the context of security documents. There will then be described, with reference to FIGS. 7 and 8, approaches that may be employed to physical isolation of a memory tag using tamper resistant or tamper evident technologies. After this, there will be described approaches for protecting information stored in a memory tag against reading by an unauthorised reader. Finally, there will be described with reference to FIG. 9 a suitable approach for reading a security document employing features of the preceding Figures.

Figure 1:
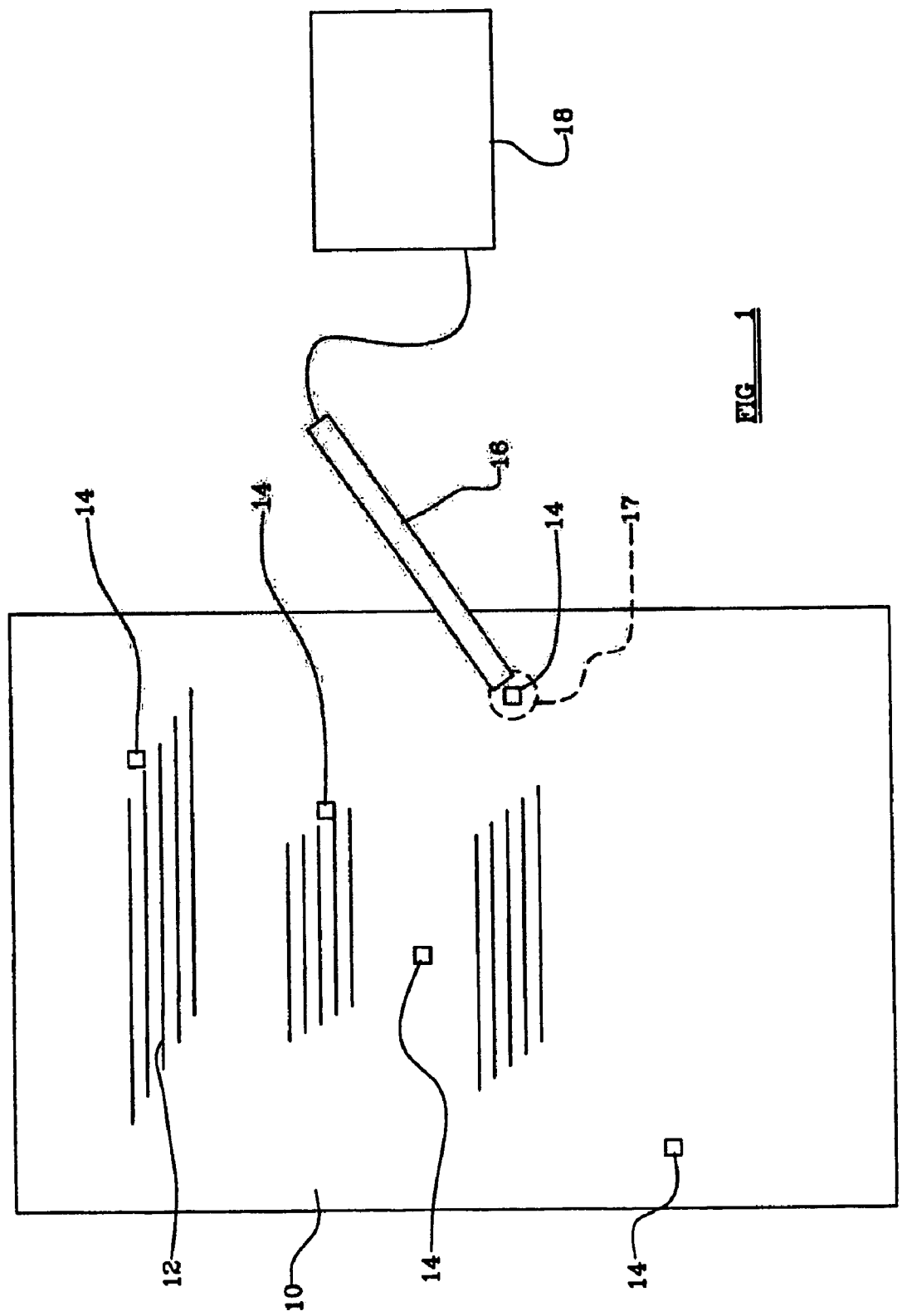
FIG. 1 illustrates a sheet of paper annotated with electronic data in a manner illustrative of an embodiment of the invention.

FIG. 1 illustrates an item, in this case a sheet of paper 10, bearing printing 12, which has been annotated with electronic data using a plurality of memory tags 14. The memory tags 14 have been secured to the sheet of paper 10 at various locations over its surface, although they may alternatively be embedded in the paper sheet 10, preferably in locations identified by the printing 12, in order to assist in locating them for the purposes of reading data from or writing data to the memory tags 14.

A hand held reader device 16 is used to communicate with the memory tags 14 in wireless manner, as will be discussed further below. The reader device 16 is also connected to a host computer, display, data rendering device or other apparatus 18 to which the data read from the memory tags 14 is passed. In the general case for this technology, reader device 16 will also be able to write to the memory tags 14—however, in the case of security documents, this will either be prevented, or such writing will only be in addition to, rather than to replace, security data stored within the memory tag 14.

Figure 2:
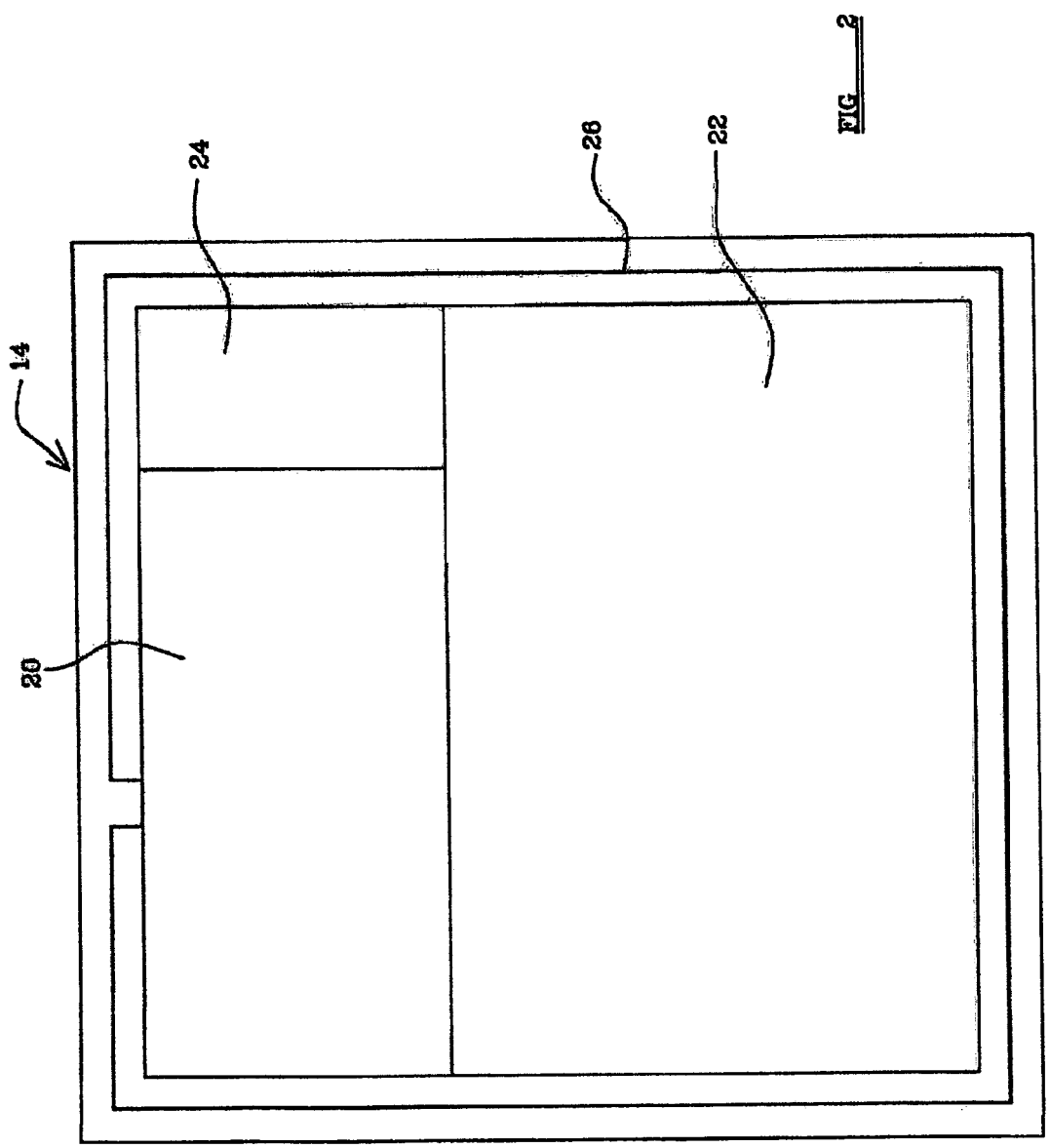
FIG. 2 illustrates an RFID memory tag sutiable for use in the embodiments of the invention.

Referring now to FIG. 2, a schematic of a memory tag 14 is shown. The memory tag 14 is an RFID memory tag provided on a chip, and comprises an RFID transponder circuit 20, a memory 22, a power supply capacitor 24 and an antenna coil 26 having only a few turns e.g. five, or as in this case a single turn. The RFID transponder circuit 20 operates at 2.45 GHz, is of an area of approximately 0.5 $mm^2$, and will be described further below. The memory 22 provides 1 Mbit of capacity of non-volatile memory and is of an area of approximately 1 $mm^2$, and may generally FRAM (ferroelectric random access memory) or MRAM (magnetoresistive random access memory) or similar memory technology requiring low power—in the case of security applications, an appropriate form of read only memory (ROM) may instead be employed. The memory tags 14 are of a substantially square shape in plan view with an external dimension D for their sides of around 1 mm.

Figure 3:
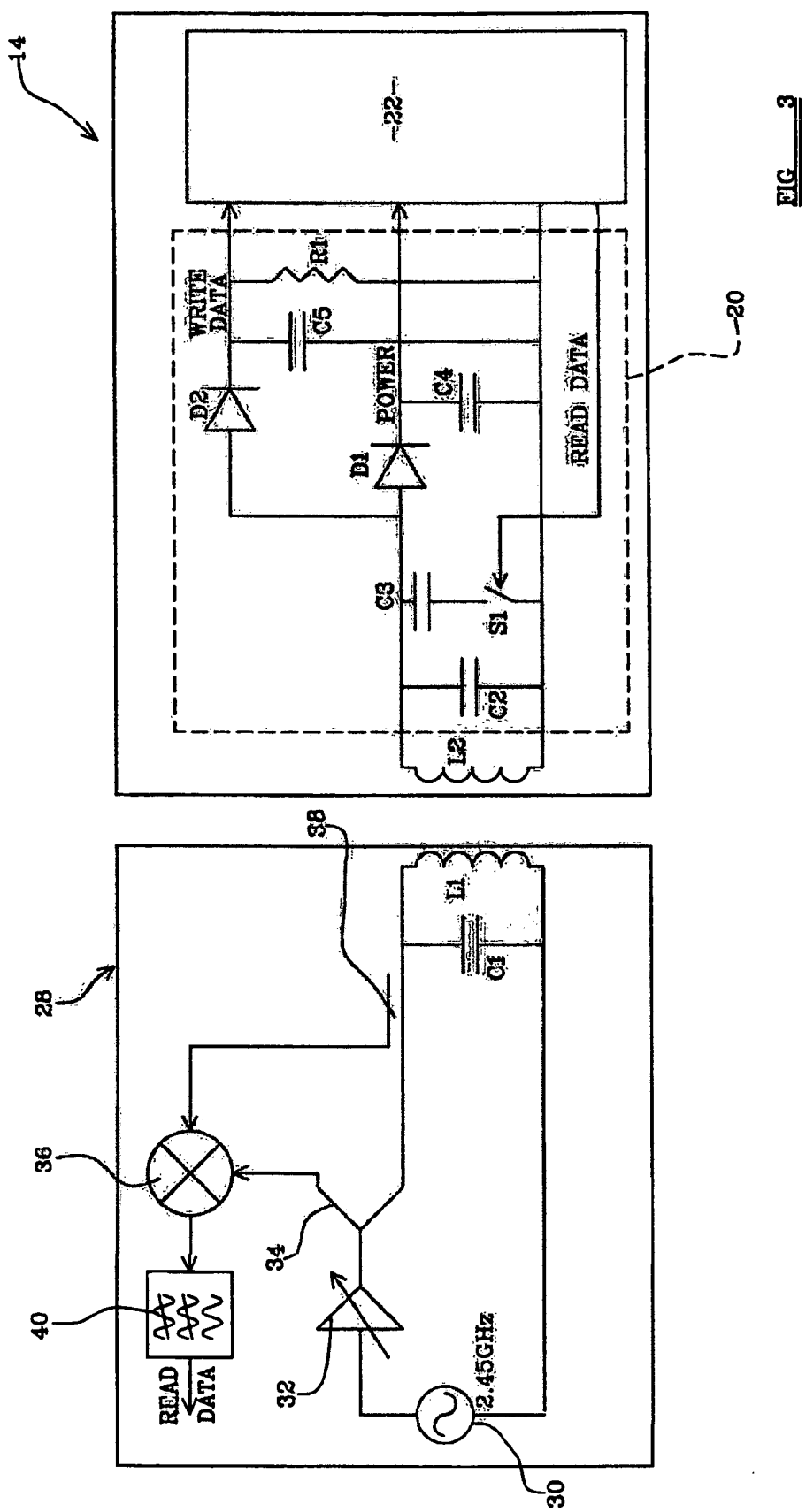
FIG. 3 illustrates the circuitry of the memory tag of FIG. 2 and of a read/write device for wireless communication with the memory tag.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The RFID transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the reader device 16 is diode D2, capacitor C5 and resistor R1 which form a simple envelope detector; the data thus received is stored in memory 22 (in the case of a security document, memory 22 may be divided into RAM which can be written to by the reader 16, and ROM which cannot be so written to—writing to the memory tag 14 may of course be inhibited altogether). The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the reader device 16.

The circuit 28 of the reader device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other device 18 to which the reader device 16 is connected, for subsequent data processing.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 14.

With the apparatus of memory tag 14 and reader device 16 described above power transfer of around 25% can be achieved with a distance of around 1.8 mm between the antennae L1 and L2, of the reader device 16 and memory tag 14 respectively. This is sufficient to transfer enough power to the memory tag 14 for it to operate.

The memory tags 14 have an external dimension D of around 1 mm, as described above, and therefore the reader device 16 can communicate with them over a relatively short range, in this example of approximately 2D, (as illustrated on FIG. 1 by broken circle 17). However, the distance over which the reader device 16 and memory tag 14 will communicate effectively will clearly vary with the exact details of their construction, and it may therefore be up to 10D. Distances greater than this would limit the ability to use a plurality of memory tags 14 on a single sheet of paper 10, or other item, due to the distances which would be necessary between the memory tags 14 to ensure that the read/write device 16 does communicate with the desired memory tag 14 out of a number present. To ensure that communication is with the correct memory tag 14 in every circumstance a communication distance of 5D or less is preferable.

The memory tags 14 will preferably have a data rate of 10 Mbitss$^{-1}$, which is two orders of magnitude faster than is typical in prior art devices. Such a data rate would enable the read/write device 16 to be held over the memory tag for a very short period of time ("brush and go") for the data to be read or written as appropriate.

Although the memory tags 14 described above operate at 2.45 GHz it should be understood that memory tags operating at other frequencies may be used to implement the invention. Factors affacting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

It should further be appreciated that memory tags of this functional type can be produced without using RFID technology. For example, optical technologies can be used to power, read and write to memory tags, as described in the applicant's earlier British Patent Application No. 0227152.6.

Figure 4:
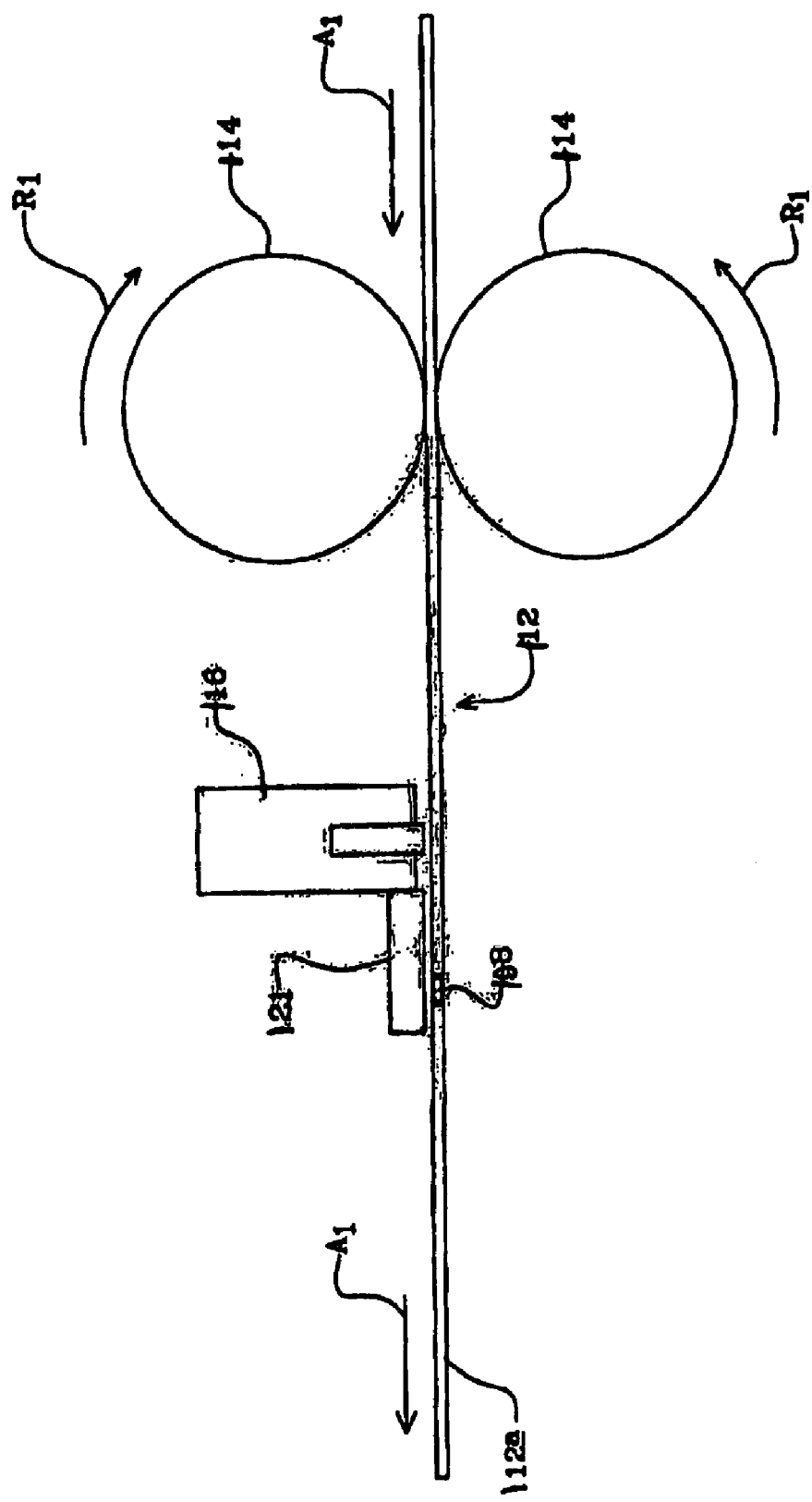
FIG. 4 is a schematic of the main elements of a printing device suitable for executing a method according to embodiments of the invention from the side.
Figure 5:
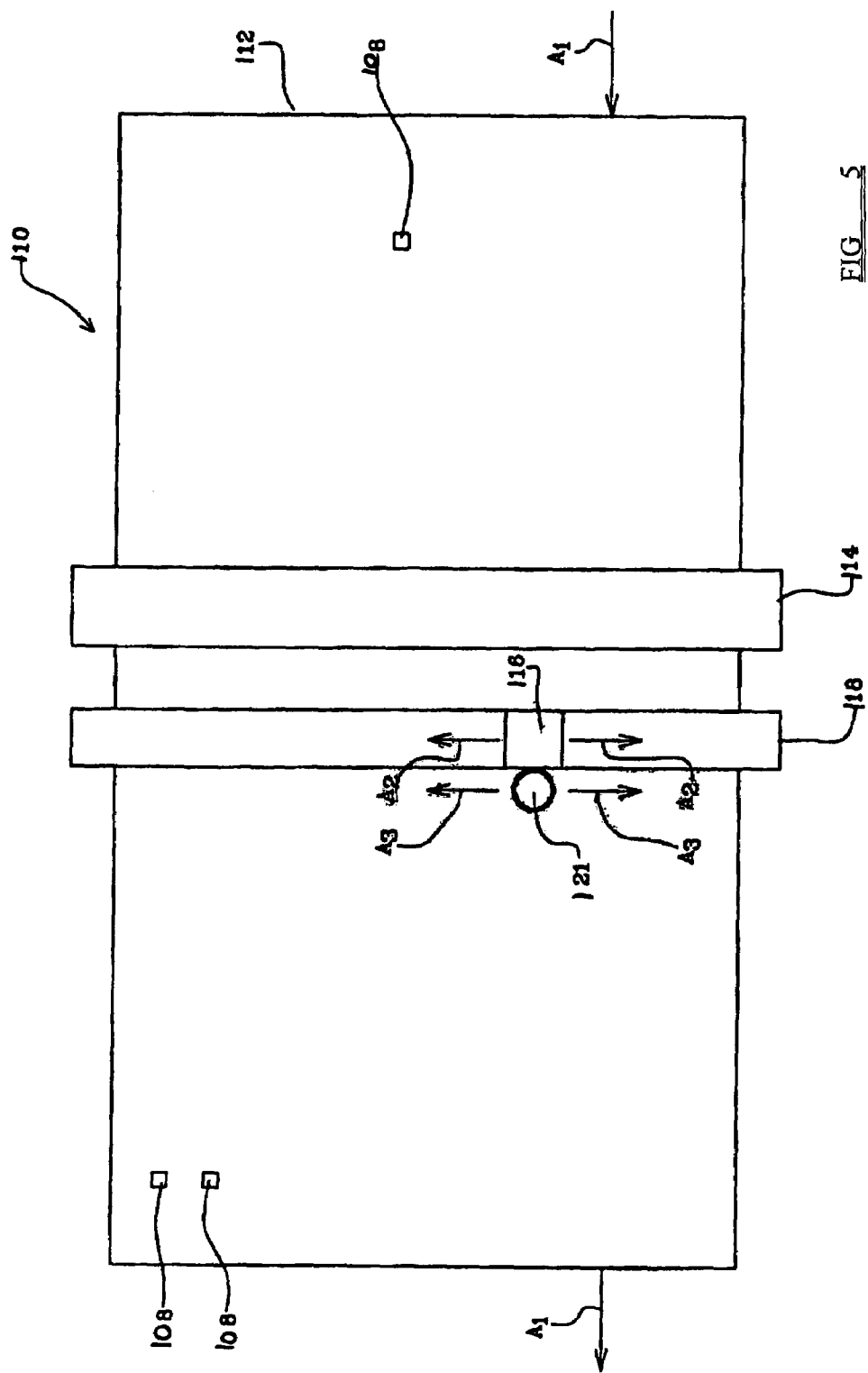
FIG. 5 is a schematic of the apparatus of FIG. 4 from above.

Referring to FIGS. 4 and 5, apparatus 110 for printing onto a base medium and data writing to a memory tag in or on the base medium is illustrated. This embodiment is for use with a base medium in the form of sheet paper 112, to which memory tags 108 have been applied or within which memory tags 108 have been embedded (as shown in FIG. 4). The memory tags 108 are RFID memory tags for which the manner of writing data to the tags and reading data from the tags is well known (see above, but in addition for example the RFID Handbook, Klaus Finkenzeller, 1999, John Wiley & Sons). For simplicity only those parts of the apparatus 110 which need to be shown to describe the invention are illustrated and described. It will be understood that the apparatus 110 includes much known technology from the prior art of printers, and from the prior art of RFID memory tags, which is not described here.

The apparatus 110 includes paper feed rollers 114 which are driven to rotate as indicated by arrows R1 to feed the paper sheets 112 through the apparatus 110 along a first axis in the direction indicated by arrows A1.

The apparatus 110 further includes a print head 116, which in this example is of ink jet form, mounted on a print head carriage 118 which extends across the apparatus 110 substantially perpendicular to the axis A1. The print head 116 is moveable back and forth along the print head carriage 118, in known manner. Thus the print head 116 is moveable back and forth along a second axis indicated by arrows A2, substantially perpendicular to the axis A1, to enable the print head 116 to access most of the upper surface 112a of the paper sheet 112 as it moves through the apparatus 110, and thus to print anywhere on that accessible area of surface 112a as required.

The apparatus 110 also includes a memory tag read/write device 120 which operates in known manner to write data to and/or read data from memory tags as required using an inductive coil 121. The inductive coil 121 of the memory tag read/write device 120 is connected to the print head 116 for movement back and forth along the print head carriage 118 with the print head 116. Thus the inductive coil 121 is moveable back and forth along a third axis indicated by arrows A3, substantially perpendicular to the axis A1, and parallel to the axis A2, to enable the memory tag read/write device 120 to read data from and/or write data to memory tags 108 located anywhere on or in the accessible area of the paper sheet 112, as will be described further below.

Figure 6:
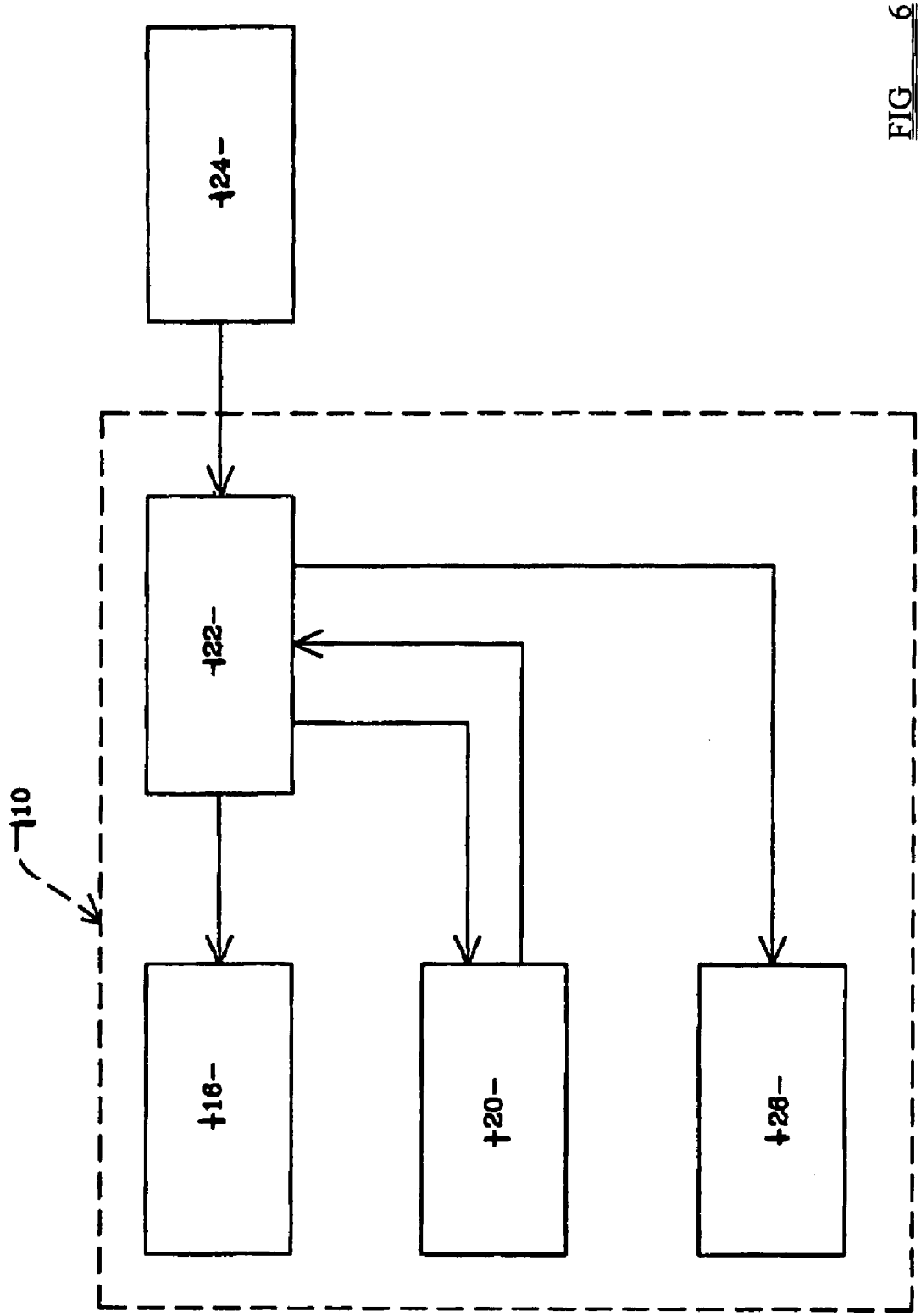
FIG. 6 is a block diagram of the control of the apparatus of FIGS. 4 and 5.
Figure 7:
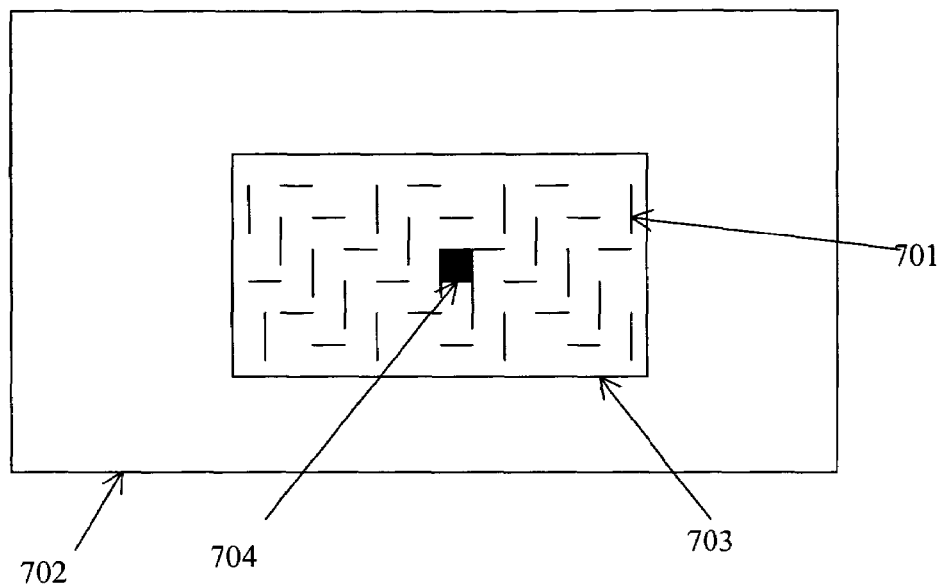
FIG. 7 describes a tamper-evident security feature for a security document with respect to physical tampering.

Referring now also to FIG. 6, the apparatus 110 also includes a main processor 122 and a mechanics controller 126, which controls all the mechanical operations of the apparatus 110, (i.e. the paper feed rollers 114, the movement of the print head 116 and inductive coil 121 along the print head carriage 118). The main processor 122 receives instruction signals from a host computer 124, including the details of:

what to print;

where to print it;

where the memory tag 108 is or tags 108 are in/on the paper sheet 112; and what data to write to the memory tag(s) 108.

The main processor 122 sends command signals as required to:

the mechanics controller;

the print head 116; and the memory tag read/write device 120, to implement the instruction signals.

Thus the paper sheet 112 is fed through the apparatus 110 and has the required information printed on its upper surface 112a. At the same time the memory tags 108 on or within the paper sheet 112 have the necessary data written to them by the memory tag read/write device 120, with the movement of the memory tag read/write device 120 (and print head 116) being paused with the memory tag read/write device 120 over the or each memory tag 108 as necessary for the data writing to take place.

The manner of co-ordination of the printing and data writing processes will depend on a number of factors. If, for example, the memory tags 108 are only present adjacent the top and/or bottom of the paper sheet 112 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 112.

In embodiments of the invention, the memory tags 108 will typically be read by hand held readers. Thus in order to assist users in the future to locate the memory tags 108 on the paper sheet 112 the memory tags 108 may have icons printed over their locations which can be readily identified by users. It is of course possible in the case of security documents that the location of memory tags 108 may not be advertised in this fashion, and that the position of memory tags may be concealed or multiple memory tags, some of which contain deceptive content, are provided, and that part of the authorisation information received by an authorised reader of the document is the knowledge of which memory tag 108 contains the valid information.

The memory tag read/write device 120 may, in addition to writing the data to the memory tags 108, also conduct a read operation to check that the data has written successfully before the paper sheet 112 is moved on following the data write operation. Alternatively, particularly if the apparatus 110 is operating at high speed, a separate data check device (not shown) may be included in the apparatus such that this operation takes place downstream of a memory tag write device which in this case need not also be capable of data reading.

It will be readily appreciated by the person skilled in the art that the modification to a conventional printing technology (in this case, the functional structure of the printing device is that customarily found in inkjet printing technology) can be employed to functional structures used in other printing technologies, such as laserjet and digital presses (such as HP Indigo presses). This last technology is particularly suitable for mass production of documents, for example book publication.

It can be seen from the above that there is no fundamental complexity involved in creating and publishing documents in accordance with embodiments of the invention using printing technology described in FIGS. 4 to 6. As for the content generation stage, conventional word processing and web publishing software (such as Microsoft Word and Microsoft Frontpage respectively) familiarly allows inserts of data of a different data type—in web publishing in particular, it is familiar to determine an icon for rendering that has a hyperlink function and can serve, if activated by a reader of the document, to link to another page or a file (such as a sound clip). Essentially the same approach can be taken here—the user composing the document on host computer 124 can place or identify a memory tag position on the page being composed and may designate a particular file to be stored in that memory tag. The document for printing, the files for the memory tags, and all placement information can then be provided by the document generation software on host computer 124 to the main processor 122 of the printing device for rendering as described above.

The security document contains at least two discrete forms of protection for the security information stored in the memory tag: protection against physical tampering, and protection against unauthorised reading. These will be considered in turn, together with any modification to the basic technology described above (in many cases it will be necessary for the physical isolation step to be completed after the document creation stages indicated above—in particular, to convert the memory tag to a read-only one, either by physically modifying the memory tag structure after writing or by preventing write access to the memory tag).

As the memory tag is both read and powered wirelessly, it is possible for it to be physically isolated (by encapsulation or otherwise). This physical isolation needs to be such that the memory tag can still be powered and read, and such that it can still be incorporated within or attached to the printed document. It is possible to protect the memory tag against the effects of physical tampering and still accept these constraints. Approaches to protection against tampering include using tamper-evident protection, and using tamper-resistant protection. Examples of each will now be described.

Tamper-evident protection does not itself prevent physical tampering. It does, however, show when physical tampering has occurred. For tamper-evident protection, it is necessary only that physical tampering will result in irreparable effects to the physical document that will be apparent on subsequent inspection. An example is the tamper-evident signature strip described in U.S. Pat. No. 5,762,378, in which the fabric of the tamper-evident area is weakened by a pattern of cuts through the paper substrate (illustrated in exemplary fashion in FIG. 7) in such a way that the cuts 701 through the paper substrate 702 in the tamper-evident area 703, which here also includes a memory tag 704, are such that attempts at physical modification within the tamper-evident area 703 will lead to irregular tearing patterns.

Tamper-resistant protection, by contrast, aims to prevent physical tampering. By "tamper-resistant", it is not here implied that a tamper-resistant device is immune to all forms of tampering, however technically sophisticated. As is described in the literature of tamper protection (see, for example "Tamper Resistance—a Cautionary Note", by Ross Anderson and Markus Kuhn, published in "The Second USENIX Workshop on Electronic Commerce Proceedings", Oakland, Calif., Nov. 18-21, 1996, pp 1-11), most forms of tamper resistance can be overcome with sufficient time, money, and technical sophistication. Here, it is understood that protection is "tamper-resistant" if it is sufficient to increase significantly the level of difficulty for an attacker in achieving effective physical tampering.

Figure 8:
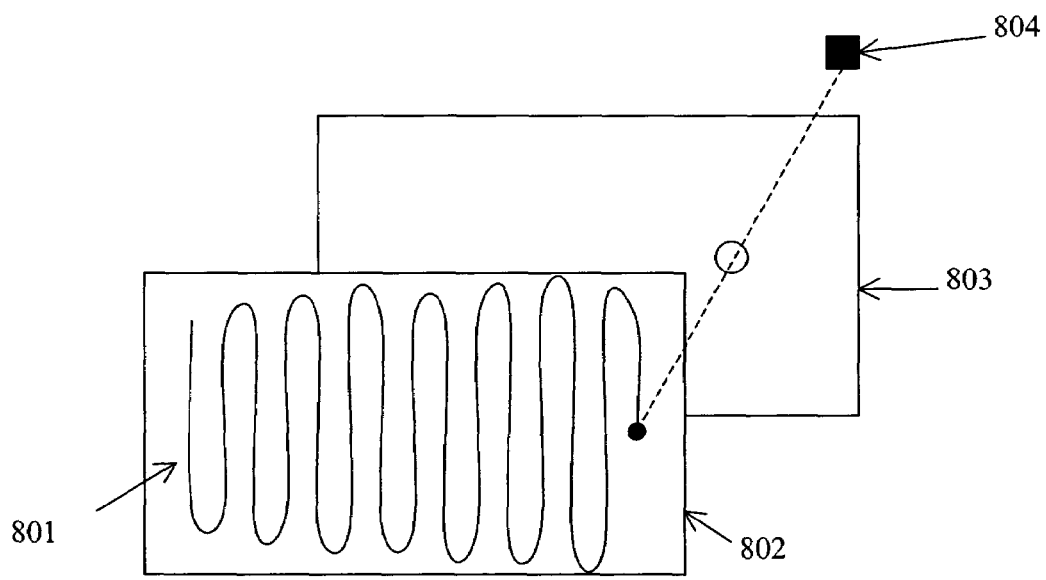
FIG. 8 describes a tamper-resistant security feature for a security document with respect to physical tampering.

As indicated above, a significant consideration in achieving effective tamper-resistant protection is that the ability to read data from the memory tag should be preserved. Full electromagnetic shielding of the memory tag—one known tamper-resistance technique—is thus not an option. A technique which may be an option, however, is effective design of the memory tag antenna. FIG. 8 shows an antenna structure for tamper protection. An antenna 801 on a Mylar sheet 802 is attached through an earth plane sheet 803 to the memory tag 804—the whole assembly being encapsulated and fixed on to the paper document (not shown). Advantageously, the memory tag in this arrangement may be written to, and then physically prevented from being rewritten, before the construction of the tamper-protected device. The meandering structure of the antenna (which may of course be a great deal more complex than shown here) has a secondary use as an inhibitor of the memory tag. A physical property of the antenna (such as its impedance, or time of flight along it) may be measured by the memory tag (which therefore will need to be provided with appropriate measurement circuits—the construction of which will be readily determinable by the skilled person) and compared with a known value. If this value is not returned, this will be taken as indicative of physical tampering (for example, the shorting together of two adjacent wires in the antenna) and the memory tag will not allow itself to be read by any reader.

Additional tamperproofing technologies, some but not all of which are applicable to the present use (again, this will be clearly evident to the person skilled in the art) are discussed in the applicants European Patent Application Publication No. 1273997. Again, for many of the techniques described here it will be desirable to write to the memory tag and to physically prevent further writing to the memory tag (or to a specific memory of the memory tag) before completing the tamperproofing process itself.

In addition to physical resistance to the effects of tampering, the memory tag itself provides security protection in that the information it holds is only usefully accessable to an authorised reader. This can be achieved in a number of ways, depending on factors such as the degree of security required, the length of time for which security is required, and the processing capacity (if any) available on the memory tag itself. Options, in ascending level of security, are described below.

(1) Pure Memory Without Additional Security Features on Tag—all Security Operations Take Place before Writing to Tag.

The security operations in this case take place on or before writing—for example, that the data stored in the memory tag is written with a secret. (For example, a hash function is used to take a hash over the picture of the holder, their access permissions, a reference to any credentials they produced when the badge was first created, and so on. The hash is authenticated using a secret shared among all authorised readers which could then be used (for example) as the access code in a keyed hash or MAC (Message Authentication Code). This may work very well in short term applications (eg entry to a specific event), but is less readily applicable to circumstances in which it is desired to write to the memory tag, particularly where it is necessary for the memory tag to contain updatable state information.

(2) Memory Tag with Unique ID

This provides substantial advantages for applications where writing to the memory tag is necessary. Each write to the memory tag which wishes to preserve integrity now incorporates the spot's unique ID in the hash which is MACed or signed; and each validator asks the spot afresh for its unique ID in recomputing the information-to-be-validated. This makes casual copying from one memory tag to another detectable, as the difference in unique IDs between the original and the clone will cause the hash comparison to fail.

There are a number of ways to create a unique ID. For maximum trackability, the format of a unique-ID may be (or is the unkeyed hash of) a manufacturer ID: week code: batch code: sequential number. An untrackable approach would be for the memory tag to contain a hardware-based random number generator (RNG), and upon first activation (maybe during manufacturing test) the RNG runs, the resulting unique-ID is written into write-once storage, and the writeability of that storage is reliably and permanently disabled. There's also a choice over how the unique ID is made accessible to the readers and writers: this can range from returning a raw ID to returning only a hash of a random number supplied by a reader with the unique ID. For random generation, to prevent clashes it would be desirable to have at least 256 bit unique Ids.

(3) Memory Tag with Unique ID, and on-spot Hashing (with Some Access-protected Storage)

This is the lowest security level which requires processing capacity on the memory tag. It is suitable for applications in which duplication of credentials must be detectable. It is particularly suitable where the memory tag should be relied upon to deliver results of processing over data it doesn't directly reveal, should be able to self-check the integrity of data it stores, or should be able to participate in providing confidentiality for data it stores.

Without its own processing, the memory tag needs to rely on the other components of a writing/reading/credentialing/validating system to hold all long-term and short-term secrets. A first cryptographic processing technology to employ in the tag itself is hashing, with SHA-1 being a logical choice of hash function. Hash functions are fast to execute, use relatively little RAM and code space, and are a building-block for reliable integrity checks.

One immediate use of an on-chip hashing capability is to hide the raw unique ID value from readers, instead of reporting the result of hashing that ID and a reader-supplied value. The use of that additional value would vary: it may be recorded alongside information recorded on memory tag, to allow a later recalculation of a hashed value; it may in other uses be a secret which is deliberately not recorded on the memory tag, allowing for a hash value recorded on the memory tag to be revalidated only by a validator which knows that secret value. An on-chip hashing function would also allow the memory tag to implement cryptographically-protected write-once storage, using a rolling hash of the data written into the "update-only" memory keyed with the unique ID so that the memory tag itself can report the integrity of the append-only log.

Using the hash function, it is possible to implement on-chip encryption. Briefly described, this can be done by hashing (a transform of) the unique ID and the starting address of a block of memory to create a pseudo-random stream which we XOR against the block of memory. What is stored is that encrypted form, while to read it out to a suitably-privileged reader (that would be a reader who can supply the extra secret needed for the transform of the unique ID) we recreate the keystream and XOR it against the stored data to derive plaintext.

Arrangements of this type allow for the possibility of access control: that areas of memory may be either encrypted or simply not returned to a reader unless that reader provides some suitable secret. The hash-derived keystream provides one way of doing that, with the chip returning contents of memory locations either as-they-are or XORed against a keystream determined by a combination of the unique ID and a reader-supplied quantity (a similar approach can be applied to writing). This still leaves the chip responding to all requests from all readers to read memory (with the notable exception of the uniqueID itself), relying on the result to be unintelligible without the correct key having been supplied. It may in some cases be advantageous to give the chip the capability of simply not responding to particular commands, and/or parameter values for some commands (for example, particular address ranges), unless the reader can supply an authentication value (or prove knowledge of an authentication value).

(4) Memory Tag with Unique ID, on-spot Hashing, and Asymmetric Cryptogrphic Capability This is appropriate where the memory tag has responsibility for control of data it stores, and can receive and transmit data with confidentiality and integrity. It is not apparent that many applications will require this approach to security, as the overall security of the system will generally be better improved by considering another aspect of the system (such as secure handling of authentication information provided to authorised readers).

Adding asymmetric cryptographic capability—RSA and elliptic-curve capability are both possibilities—to the spot has some notable costs: the codespace and memory requirements are non-trivial, the execution times for public-key operations are substantial (whole seconds), the management of key material and partial results becomes more complicated, and if the memory tags are expected to understand standard-format certificates too, the processing requirements go up some more. The advantage, though, is that we get a well-understood way of both validating data as having come from the memory tag, and sending it data which only it can read, without having to share the material for creating the validation and decrypting the data with any entity outside the memory tag (whether it's firmware in the reader/writer or code executing on a conventional host—PC, PDA, or similar).

(5) Memory Tag with Unique ID, on-spot Hashing, and Both Asymmetric and Symmetric Cryptographic Capability This is useful where the memory tag is required to be a self-standing cryptographic object implementing a sophisticated information management policy. Again, the number of application scenarios where this will be appropriate may be rare. This is in part because the memory tag doesn't have human-interface capabilities of its own: so although it is now capable of doing symmetric cryptography as well as asymmetric, any bulk data it is handling still has to be passed, as plaintext, either into or out of the memory tag to interact with a person (be read, listened to, dictated in, or whatever). Thus, you have to trust the interaction device not to violate your security policy—i.e. to handle that valuable plain text resulting as securely as the highly secure memory tag.

Appropriate processing for achieving hashing and asymmetric and symmetric cryptographic capability is well understood by the skilled person, and will not be further described here.

Using the approaches described above, a security document can be created which comprises a printed document and one or more memory tags. These memory tags are memory circuits adapted to be read wirelessly (preferably, inductively powered also) and are attached to or incorporated within the printed document. Data in the memory circuit is protected from access by an unauthorised reader, either by measures taken in writing the data, or by presence of a unique ID or cryptographic capacity in the memory tag itself. The memory tag is physically isolated so as to inhibit physical tampering (for example, by tamper-resistant techniques of the kind discussed with reference to FIG. 8) or to indicate when physical tampering has occurred (for example, by tamper-evident techniques of the kind discussed with reference to FIG. 7).

Figure 10:
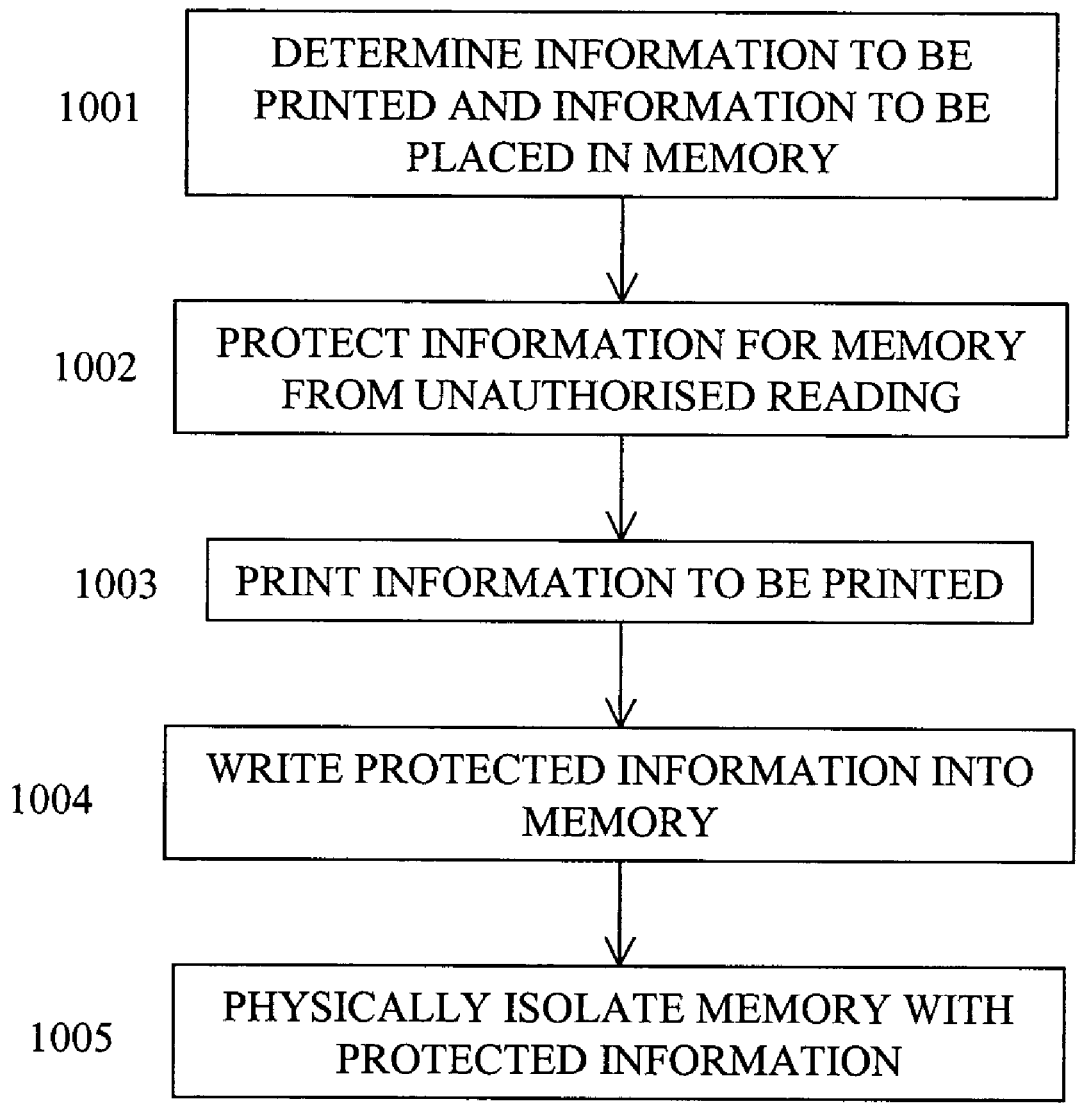
FIG. 10 shows a method of publishing a security document according to an embodiment of the invention.

The steps involved in creation of such a document are illustrated in FIG. 10. A first step 1001 is to determine some information for printing in a printed document, and further information for writing to the memory physically located in the document. Where the document is a bearer document (such as a passport or bank passbook), the printed information may include a photograph, a signature, a name or other biographical or practical details, whereas the stored information may provide similar information but most effectively will contain information which is complementary rather than identical (it may, for example, be particularly useful for bearer image information to be stored only in the memory, so that it is not visually apparent from the document on its own). A next step is to protect 1002 the memory information from unauthorised reading by one of the methods discussed above. After this, the relevant information is printed 1003 to the printed document, and the protected information written 1004 to a memory circuit, with the memory circuit being incorporated 1005 into the document such that it can be read wirelessly but in a physically isolated manner such that physical tampering is inhibited or made detectable.

Figure 9:
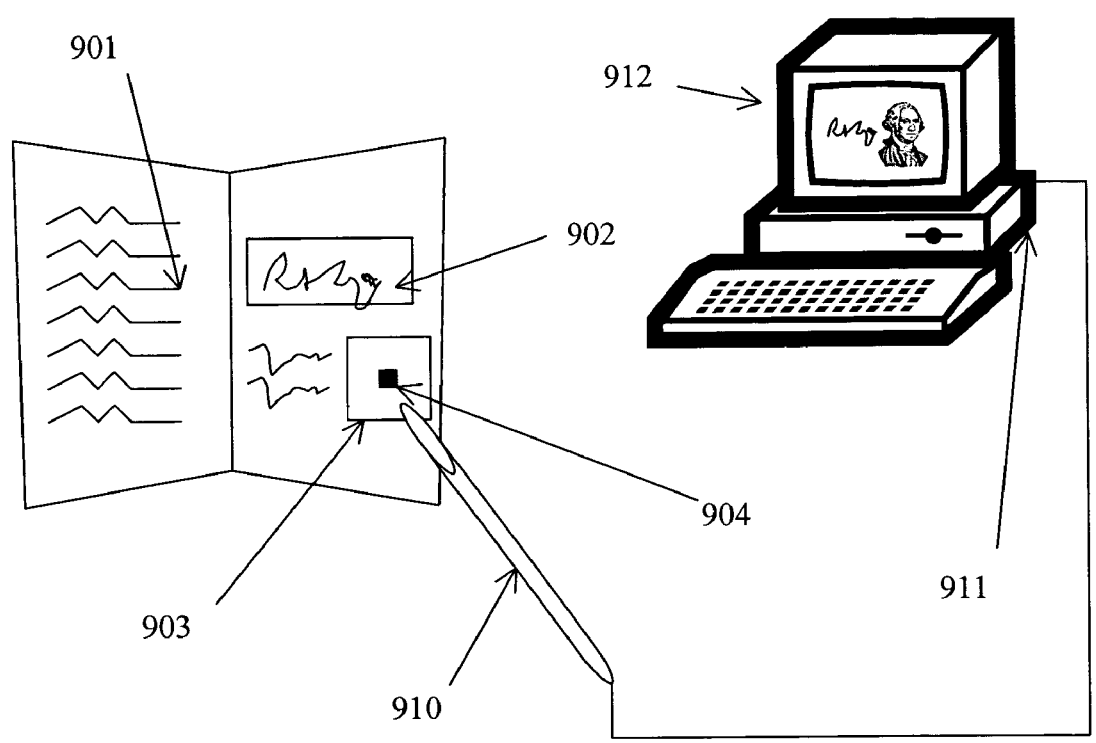
FIG. 9 shows a security document according to an embodiment of the invention and a method for reading it.
Figure 11:
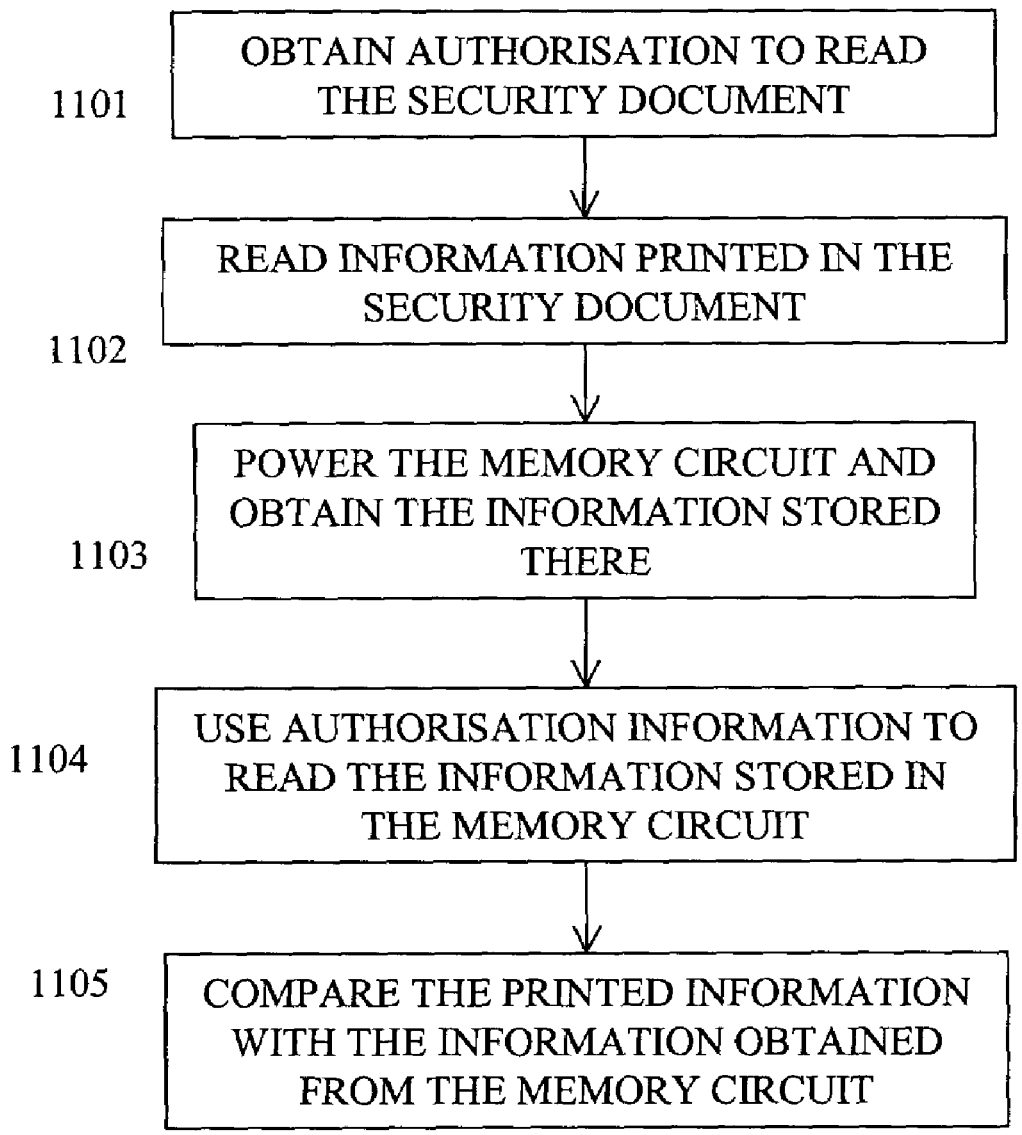
FIG. 11 shows a method of reading a security document according to an embodiment of the invention.

A security document of this type is shown in FIG. 9, which also illustrates how a document of this type would be read, with reference to FIG. 11. A security document 901 contains printed material and a signature strip 902, signed by an authorised bearer. Embedded within the security document 901 is a memory tag 903 embedded in a tamper-resistant region 903. A reader for the memory tag comprises a stylus 910 used in conjunction with a computer or other processing device 911—the processing device has a display 912.

The reader may now, or later, be equipped 1101 with authorisation information enabling it to interpret or obtain information received from the memory tag. While a user views 1102 printed information, the reader accesses 1103 the memory tag 903 to obtain information from it. The physical isolation and protection of the memory tag, together with the security policy employed in writing to or electronically protecting the memory tag, should be sufficient to give adequate confidence to the authorised reader that the memory tag has not been subverted. The information in the memory tag is then downloaded, after whatever security interchange between the memory tag processor (if there is one) and the processor 911 is required, and decrypted or otherwise converted 1104 to usable form by use of the authorisation information, to which processor 911 has access. The results are then displayed on display 912. In this case, what is displayed is the signature matching the signature on the signature strip 902, but also the face of an authorised bearer—the user of the reading device can therefore use 1105 these complementary pieces of information to determine not only whether the security document is valid (by the matching of the signatures) but also whether it is being carried by the correct person—this information not being available to an unauthorised bearer, as the security document itself contains no printed picture.

Such a security document could be used, as in the scenario described above, identify an authorised bearer of the security document. However, it could also be used to allow access to a specified asset or assets by the authorised bearer (such as a bank account). A part of this process could be to update state information (such as a withdrawal log) on the memory tag itself, for a memory tag which contains writable memory.

The invention claimed is:

1. A security document, comprising:
a printed document; and
one or more memory circuits configured to be read wirelessly and attached to or incorporated within the printed document at a predetermined position or positions with respect to the printed document,
wherein data in each of the one or more memory circuits is protected from access by an unauthorized reader,
wherein each of the one or more memory circuits is physically isolated so as to inhibit physical tampering or is configured to indicate when physical tampering has occurred, and
wherein physical isolation of each of the one or more memory circuits employs one or more tamper-evident strips, and
wherein each of the one or more memory circuits provides security for a single portion of the printed document adjacent to the respective one or more memory circuits, wherein the document comprises a plurality of portions to which security can be individually provided.

2. A security document as claimed in claim 1, wherein each of the one or more memory circuits is inductively powered.

3. A security document as claimed in claim 2, wherein each of the one or more memory circuits receives and transmits data wirelessly at radio frequency.

4. A security document as claimed in claim 1, wherein each of the one or more memory circuits includes an antenna that is configured for detection or resistance of physical tampering.

5. A security document as claimed in claim 1, wherein the security document is configured to identify an authorized bearer of the security document.

6. A security document as claimed in claim 5, wherein the security document includes means to allow access to a specified asset or assets by the authorized bearer.

7. A security document as claimed in claim 1, wherein the one or more tamper-evident strips provide a visual indication as to whether or not the one or more memory circuits has been physically tampered with.

8. A security document as claimed in claim 1, wherein the one or more tamper-evident strips correspond to at least one cut on the printed document provided adjacent to the one or more memory circuits.

9. A security document as claimed in claim 1, wherein the printed document is a sheet of paper.

10. A security document as claimed in claim 1, wherein the one or more memory circuits are provided on an external surface of the printed document that is exposed to the environment.

11. A security document as claimed in claim 1, wherein the memory circuit includes tamper resistance means for resisting tampering of the memory circuit.

12. A security document as claimed in claim 1, wherein the one or more memory circuits comprises at least two memory circuits.

13. A method of publishing a security document, comprising:
   a. determining first information for printing in a printed document, and second information for writing to one or more memory circuits for attachment to or incorporation within the printed document at a predetermined position or positions with respect to the printed document;
   b. protecting the second information from unauthorized reading;
   c. printing the first information in the printed document;
   d. writing the second information to one or more memory circuits configured to be read wirelessly for attachment to or incorporation within the printed document; and
   e. physically isolating the one or more memory circuits so as to inhibit physical tampering or configuring the one or more memory circuits to indicate when physical tampering has occurred,
   wherein each of the one or more memory circuits provides security for a single portion of the printed document adjacent to the respective one or more memory circuits, wherein the document comprises a plurality of portions to which security can be individually provided.

14. A method as claimed in claim 13, wherein the one or more memory circuits comprises at least two memory circuits.

15. A method of reading a security document comprising a printed document and one or more memory circuits attached to or incorporated within the printed document, comprising:
   a. electronically obtaining authorization information enabling the security document to be electronically read;
   b. reading first information printed on the printed document
   c. wirelessly powering at least one memory circuit and wirelessly reading protected second information stored in said memory circuit;
   d. reading, by a document reader device, the second information by using the authorization information; and using the second information together with the first information to assess the validity of the security document.

16. A method as claimed in claim 15, further comprising comparing the second information to one or more characteristics of a bearer of the security document.

17. A security document, comprising:
   a printed document; and
   one or more memory circuits configured to be read wirelessly attached to or incorporated within the printed document at a predetermined position or positions with respect to the printed document,
   wherein data in each of the one or more memory circuits is protected from access by an unauthorized reader,
   wherein each of the one or more memory circuits is physically isolated so as to inhibit physical tampering or is configured to indicate when physical tampering has occurred, and
   wherein both printed data and data in each of the one or more memory circuits is configured to identify a bearer of the security document,
   wherein each of the one or more memory circuits provides security for a single portion of the printed document adjacent to the respective one or more memory circuits, wherein the document comprises a plurality of portions to which security can be individually provided.

18. A security document as claimed in claim 17, wherein the printed document is a sheet of paper.

19. A security document as claimed in claim 17, wherein the one or more memory circuits are provided on an external surface of the printed document that is exposed to the environment.

20. A method of publishing a security document for a bearer, comprising:
   a. determining first information concerning the bearer for printing in a printed document, and second information concerning the bearer for writing to one or more memory circuits for attachment to or incorporation within the printed document;
   b. protecting the second information from unauthorized reading;
   c. printing the first information in the printed document;
   d. writing the second information to one or more memory circuits configured to be read wirelessly for attachment to or incorporation within the printed document at a predetermined position or positions with respect to the printed document; and
   e. physically isolating each of the one or more memory circuits in the printed document so as to inhibit physical tampering or to indicate when physical tampering has occurred,
   wherein each of the one or more memory circuits provides security for a single portion of the printed document adjacent to the respective one or more memory circuits, wherein the document comprises a plurality of portions to which security can be individuals provided.

21. A method as claimed in claim 20, wherein the printed document is a sheet of paper.

22. A method as claimed in claim 20, further comprising:
   providing the one or more memory circuits on an external surface of the printed document that is exposed to the environment.

23. A security document as claimed in claim 20, wherein the one or more memory circuits comprises at least two memory circuits.

24. A method as claimed in claim 20, wherein the one or more memory circuits comprises at least two memory circuits.

25. A security document, comprising:
   a printed document; and
   one or more memory circuits configured to be read wirelessly and attached to or incorporated within the printed document,
   wherein data in the memory circuit is protected from access by an unauthorized reader,
   wherein the memory circuit is physically isolated so as to inhibit physical tampering or is configured to indicate when physical tampering has occurred,
   wherein physical isolation of the memory circuit employs one or more tamper-evident strips wherein the memory circuit includes an antenna that is configured for detection or resistance of physical tampering, and wherein the memory circuit includes means for detecting a change in a physical property of the antenna, the change in the physical property being indicative of physical tampering of the antenna, wherein the memory circuit includes means for disabling reading of the memory circuit when the physical tampering of the antenna is detected.

26. A method of publishing a security document, comprising:
   a. determining first information for printing in a printed document, and second information for writing to one or more memory circuits for attachment to or incorporation within the printed document;
   b. protecting the second information from unauthorized reading;
   c. printing the first information in the printed document;
   d. writing the second information to one or more memory circuits configured to be read wirelessly for attachment to or incorporation within the printed document;
   e. physically isolating the one or more memory circuits so as to inhibit physical tampering or configuring the one or more memory circuits to indicate when physical tampering has occurred, wherein the one or more memory circuits including an antenna that is configured for detection or resistance of physical tampering;
   f. detecting a change in a physical property of the antenna, the change in the physical property being indicative of physical tampering of the antenna; and
   g. disabling reading of the memory circuit when the physical tampering of the antenna is detected.

27. A security document, comprising:
a printed document; and
one or more memory circuits configured to be read wirelessly attached to or incorporated within the printed document,
wherein data in the memory circuit is protected from access by an unauthorized reader,
wherein the memory circuit is physically isolated so as to inhibit physical tampering or is configured to indicate when physical tampering has occurred,
wherein both printed data and data in the memory circuit is configured to identify a bearer of the security document,
wherein the memory circuit includes an antenna that is configured for detection or resistance of physical tampering, and
wherein the memory circuit includes means for detecting a change in a physical property of the antenna, the change in the physical property being indicative of physical tampering of the antenna, wherein the memory circuit includes means for disabling reading of the memory circuit when the physical tampering of the antenna is detected.

28. A method of publishing a security document for a bearer, comprising:
   a. determining first information concerning the bearer for printing in a printed document, and second information concerning the bearer for writing to one or more memory circuits for attachment to or incorporation within the printed document;
   b. protecting the second information from unauthorized reading;
   c. printing the first information in the printed document;
   d. writing the second information to one or more memory circuits configured to be read wirelessly for attachment to or incorporation within the printed document;
   e. physically isolating the one or more memory circuits in the printed document so as to inhibit physical tampering or to indicate when physical tampering has occurred, wherein the one or more memory circuits including an antenna that is configured for detection or resistance of physical tampering,
   the method further comprising:
   f. detecting a change in a physical property of the antenna, the change in the physical property being indicative of physical tampering of the antenna; and
   g. disabling reading of the memory circuit when the physical tampering of the antenna is detected.

* * * * *